United States Patent [19]
Paruchuri et al.

[11] Patent Number: 5,833,921
[45] Date of Patent: Nov. 10, 1998

[54] LEAD-FREE, LOW-TEMPERATURE SOLDER COMPOSITIONS

[75] Inventors: Mohan R. Paruchuri, Canton; Dongkai Shangguan, Novi, both of Mich.

[73] Assignee: Ford Motor Company, Dearborn, Mich.

[21] Appl. No.: 938,574

[22] Filed: Sep. 26, 1997

[51] Int. Cl.⁶ .................................................. C22C 30/04
[52] U.S. Cl. ........................... 420/589; 420/562; 420/577
[58] Field of Search ...................... 420/557, 561, 420/562, 577, 580, 589

[56] References Cited

U.S. PATENT DOCUMENTS

| | | | |
|---|---|---|---|
| 3,549,355 | 12/1970 | Postma | 75/134 |
| 4,806,309 | 2/1989 | Tulman | 420/562 |
| 4,879,096 | 11/1989 | Naton | 420/561 |
| 4,929,423 | 5/1990 | Tucker et al. | 420/561 |
| 5,256,370 | 10/1993 | Slattery et al. | 420/557 |
| 5,368,814 | 11/1994 | Gonya et al. | 420/587 |
| 5,393,489 | 2/1995 | Gonya et al. | 420/561 |
| 5,435,857 | 7/1995 | Han et al. | 148/24 |

FOREIGN PATENT DOCUMENTS

| | | |
|---|---|---|
| 652072 | 5/1995 | European Pat. Off. . |
| 715927 | 6/1996 | European Pat. Off. . |
| 19542043 | 8/1996 | Germany . |
| 19647478 | 7/1997 | Germany . |
| 62-252693 | 11/1987 | Japan . |
| 03128192 | 5/1991 | Japan . |
| 03204194 | 9/1991 | Japan . |
| 08252688 | 10/1996 | Japan . |
| 149670 | 3/1990 | Poland . |

OTHER PUBLICATIONS

Bady anov, B.N.; Malyugin, M. Yu, "Selection of Solder for Joining of thermoelectric modules," Svar. Proizuod., (1996), (2), 34–35.

*Primary Examiner*—Sikyin Ip
*Attorney, Agent, or Firm*—Lorraine S. Melotik

[57] ABSTRACT

Electrical solder compositions (by weight percent) having between 43–58% Sn; 38–52% Bi; and at least one of: 5–15%Sb; 1–4.0% Cu; 2% In; and 1–2% Ag, and having a melting temperature 133°–167° C. The solders are lead-free and have low melting points making them particularly useful for applications wherein components being joined involve thermoplastic substrates.

1 Claim, No Drawings

LEAD-FREE, LOW-TEMPERATURE SOLDER COMPOSITIONS

FIELD OF THE INVENTION

The present invention relates to an electrical solder composition comprising tin (Sn), bismuth (Bi) and at least one metal selected from antimony (Sb), copper (Cu), indium (In), and silver (Ag). More specifically, the present invention relates to an electrical solder composition containing (in weight percent) between 43–58% tin(Sn); 38–52% bismuth (Bi); and at least one of: 5–15% antimony (Sb); 1–4% copper (Cu); 2% indium (In); and 1–2% silver (Ag); the solder having a melting temperature 133°–167° C.

BACKGROUND OF THE INVENTION

Soldering compositions or alloys are compositions which join two materials by wetting their surfaces and then solidifying to a mechanically strong solid. Lead-tin solders are most commonly used. Lead has been found to be a toxic material whose handling and disposal increases manufacturing costs and complexity. Hence, the trend has been in recent times to lead-free solder compositions such as those listed below in Table 1. These listed lead-free solders contain instead tin (Sn), bismuth (Bi), silver (Ag), copper (Cu) and a variety of other materials.

TABLE 1
(Prior Art)

| U.S. Pat. No. | Sn [Wt %] | Bi [Wt %] | Cu [Wt %] | Ag [Wt %] | Other [Wt %] | Melting Point [°C.] |
|---|---|---|---|---|---|---|
| 4,879,096 | 88–99.35 | 0.1–3 | 0.5–6 | 0.05–3 | | 217–234 |
| 4,929,423 | 78.2–99.89 | 0.08–20 | 0.02–1.5 | 0.01–1.5 | 0–0.1 P 0–0.2 Rare Earth | 187–246 |
| 5,393,489 | 93.5–94 | 1.0–2.0 | 1.0 | 2.5–3 | 1.0–2.0 Sb | 218–255 |
| 3,549,355 | 41.1 | 58.11 | | | 0.75 Sb 0.04 As | |
| 4,806,309 | 90–95 | 1–4.5 | | 0.1–0.5 | 3–5 Sb | 218–235 |
| 5,435,857 | 86–88 | 0–10.5 | | 1.7–2.3 | 0.4–0.8 Sb 10.5–11.5 In | 188–206 |
| 5,256,370 | 70–92 | | | 1–6 | 4–35 In | 167–213 |

U.S. Pat. Nos. 4,879,096 and 4,929,423 teach plumbing solder compositions which have a high melting point and a wide melting range and are used for joining copper tubes and brass pipe and fittings. Plumbing solders are generally formulated to have a wide melting range to easily flow between the fittings. They generally melt at much higher temperatures than, e.g., electrical solders, because the underlying base materials (metal plumbing fixtures) can easily withstand these higher melting temperatures. U.S. Pat. No. 5,393,489 discloses a lead-free solder for microelectronic applications. They are disclosed as particularly useful, e.g., in joining integrated circuit chips to chip carriers. The solders disclosed have relatively high melting points and a wide melting range. The solder of U.S. Pat. No. 3,549,355 based mainly on tin and bismuth, is suggested for connecting together oxide ceramic magnetic components but, due to the inclusion of As, is highly toxic. The solder of U.S. Pat. No. 4,806,309 is a tin based solder containing bismuth which has a high melting point and wide melting range. A solder based on tin and indium is disclosed in U.S. Pat. No. 5,435,857. This solder has a high melting point and a wide melting range and is costly because of the inclusion of a significant amount of indium which precludes its use in large commercial volumes as is anticipated for the present invention. Another solder based on tin and having a high level of indium is disclosed in U.S. Pat. No. 5,256,370.

The present invention is directed to lead-free solders which would be ideally suited for electronic applications. Currently, the vast majority of electronics manufacturing activities use eutectic tin-lead (63% Sn–37% Pb) solder, the melting temperature of which is 183° C. Solders suitable for use in electronic applications should be strong and creep and corrosion-resistant and should be reasonable electrical conductors. One object of the present invention is to provide a solder particularly useful in electronic applications where a low temperature solder would be necessary. Such application may include joining components in the presence of low temperature substrates like thermoplastic materials. One of the current options being explored, e.g., in automotive manufacture, is to provide electrical circuit components like integrated circuit chips and chip carriers on plastic components of the automotive vehicle like the dashboard. This is projected to reduce circuit complexity and weight of the vehicle due to such electrical component integration. Particularly for such applications, it would be desirable to have a lead-free solder, with a low melting point of below about 170° C., i.e., suitable to be used in the present of such plastic components and also to protect the electrical components. Low temperature soldering will also enable the use of low cost electronic components by reducing the thermal exposure during soldering. Note that the soldering temperature is normally 25°–35° C. higher that the melting temperature of the solder alloy. In addition, such low-melting temperature solders should desirably generally have a narrow melting temperature range because it allows the electrical contacts to solidify rapidly which reduces thermal exposure of electrical components and substrates, and generates desirable microstructure of the solder joint. Additionally, having a narrow melting temperature desirably enhances the rate of production of the electronic components. On the otherhand, in order to withstand thermomechanical loading on the solder joint during service of the electronic module, it is required that the solder alloys have a melting temperature above 125° C., preferably above about 130° C. It is also necessary for useful electrical solders that they exhibit favorable thermal and electrical conductivity and satisfactory mechanical properties.

It also is highly desirable, if such solder alloy is to receive widespread commercial use, that it be low in cost. Almost all of the lead-free solders that have so far been developed for electronics packaging applications contain indium (In) in significant amounts. For example, Indalloy 227, available from the Indium Corporation, contains as much as 22% In, and many other low temperature alloys also rely on the presence of In to reduce the melting temperature. However, the world mineral reserve of indium is very limited; it is estimated that if the lead-tin solders used today should all be converted to an alloy that contains 22% In, then the entire world reserve of In could only sustain worldwide electronics production for a very short time. Not surprisingly, indium is very expensive. Thus another and critical object of this invention is to develop a low temperature lead-free solder that does not contain more than 2.5% indium. The present invention solder attains these objectives and advantages and overcomes the deficiencies attributed to prior art solders.

SUMMARY OF THE INVENTION

The invention is an electrical solder composition comprising: 43.0–58.0% Sn; 38–52% Bi; and at least one of:

5–15% Sb; 1–4% Cu; 2% In; 1–2% Ag. The solder has a melting temperature 133°–167° C. Preferably, the solder most desired in this invention comprises 43% Sn; 47% Bi; and 10% Sb and has a melting temperature of 145°–148° C.

The invention lead-free solder is especially well suited for automotive electronics applications because of its ability to withstand long term thermal cycling. It also is affordable for large volume production use and can be expected to be available in a reasonable supply therefor. These and other advantages, features and objects of the present invention will become more apparent to those of ordinary skill in the art upon reference to the following description.

DETAILED DESCRIPTION OF THE PREFERRED EMBODIMENTS

The present invention is directed to a lead free solder that provides a low melting temperature, thus enabling the use of low cost, low temperature substrate materials such as thermoplastics for automotive vehicle instrument panel integration. It also allows for the use of low cost electronic components, by minimizing thermally induced damages on the components and substrate during soldering. And because of its low cost, it is suitable for large volume production use. That is, the solder alloys use ingredients that are of low cost and widely available and does not rely on significant amounts of included indium to reduce the melting temperature, indium being very expensive and very limited in resource and supply. Further, since the solder alloys of the invention do not include lead, it avoids toxicity problems associated with use and disposal. The invention solder is also compatible with existing flux systems.

The present invention solder can be readily made into appropriate forms, such as solder paste, bar solder, wirecore solder form, etc., through well established methods. And it can be used for reflow, wave soldering, or any other soldering applications. They have been found useful on conventional printed wiring boards or the integrated instrument panels discussed above. They can be used for consumer electronics as well to enable the use of low cost substrate materials and low cost electronic components. The invention solders also have been shown to not cause any corrosion problems for materials which are to be joined.

In particular, however, this invention solder has been shown as being a durable and damage resistant electrical interconnect for electronic components exposed to wide temperature variations as is commonly found in automotive applications. A common automotive test for measuring the durability of a solder is to expose the interconnect to a large temperature variation, typically from −40 to 105° C. In this accelerated test, temperature variation is repeated more than one thousand times. Each cycle from hot to cold causes the substrate, electronic component, metal leads and the solder to expand and contract (often with widely different coefficients of thermal expansion).

The repeated cycle of hot and cold may cause fatigue in the solder interconnect and weaken the attachment. If the weakening is extensive, the interconnect can fail by solder cracking and the component becomes inoperable. While not wishing to be bound by the following theory, it is believed that the thermal cycling causes the microstructure of the solder to coarsen. The coarser grain structure can lead to reduced fatigue strength and makes the solder more susceptible for crack formation and propagation under thermomechanical loading. The present solder avoids such problems because small amounts of alloying additions of at least one of Sb, Cu, In and Ag reduce grain growth during thermal cycling, thereby increasing the microstructural stability and enhancing the fatigue strength of the solder joints.

The solder compositions that were found to include the preferred properties include: 43.0–58.0% Sn; 38–52% Bi; and at least one selected from: 5–15% Sb; 1–4% Cu; 2% In; 1–2% Ag and having a melting point of about 133°–167° C. The most preferred compositions are listed in the table below.

Fabrication of Sample Compositions

Solder samples were fabricated using well-established methods. High purity metals were used as starting materials. These included 99.99+% Sn, Bi and Sb shots, 99.99+% Cu, In and Ag wire bits. These ingredients were mixed in pre-determined proportions. Alumina crucibles were used. The ingredients were melted in a tube furnace, under a flowing $N_2$ atmosphere to prevent oxidation. The alloy was kept in a molten state for up to 20 minutes and stirred for homogenization. Furnace temperature was measured with thermocouples and recorded with a chart recorder.

The following samples were made by mixing respective starting metals in the proportions shown below.

Chemical Compositions

TABLE 2

Invention Solder Alloys (weight percentages)

| sample # | Sn | Bi | Sb | Cu | In | Ag | M.P. (°C.) |
|---|---|---|---|---|---|---|---|
| 1 | 43 | 52 | 5  |   |   |   | 145.5–148 |
| 2 | 43 | 47 | 10 |   |   |   | 145–148 |
| 3 | 43 | 42 | 15 |   |   |   | 145–148 |
| 4 | 58 | 38 | —  | 4 |   |   | 140–167 |
| 5 | 58 | 38 | —  | 2 | — | 2 | 140–162 |
| 6 | 53 | 43 | —  | 4 | — | — | 140–157 |
| 7 | 53 | 43 | —  | 2 | — | 2 | 140–152 |
| 8 | 53 | 43 | —  | 1 | 2 | 1 | 134–137 |
| 9 | 58 | 38 | —  | 1 | 2 | 1 | 133–152 |

Samples were taken from each alloy ingot and submitted for chemical analysis. Results indicate that the final alloy composition is close to the starting composition.

Thermal cycling is a process of aging the soldered component between temperature extremes (typically −40 to 105° C.). The present invention solders showed excellent resistance to cracking at the interconnects during thermal cycling. Thus, another feature of the present solders is their stability after thermal aging. This long term thermal stability is essential for solder interconnects used in automotive applications.

Differential Scanning Calorimetric (DSC) Analysis

Samples were taken for each alloy ingot for DSC analysis. The melting temperatures of the alloys in Table 2 were determined by differential scanning calorimetric (DSC) analysis. The analysis was performed using a DuPont DSC 2910 system under a flowing $N_2$ atmosphere at a given heating/cooling rate (5° C./minute). The characteristic temperatures from the DSC curves were analyzed to determine the melting temperatures of the alloys, which are summarized in Table 2 above.

Application

Alloys 1–9 were found to be non-toxic and readily manufacturable. They produced few toxic or hazardous waste materials and utilized existing commercial equipment for manufacturing and usage. Because of the relatively low indium and silver contents, the alloys were low cost and suitable for production in large commercial quantities.

The solders made from these compositions may be used in either a paste form (as in reflow soldering) or alternatively in bar solder form (as in wave soldering). Regular soldering processes (reflow, wave soldering and others) may be used with these solder compositions. In each case, the soldering peak temperature will generally be at least 10°–15° C. or preferably 15°–30° C. above the melting temperature of the solder alloy.

Different alloys may be adapted for further improvement of mechanical and physical properties by the inclusion of small quantities (up to about 3%, generally when used at about 0.1–3.0% by weight) of other elements such as Te, Se, Au, Ni, Zn, Ce, Cs, Co, Si, Mg, Ca, and combinations of any of them.

While the best mode for carrying out the present invention has been described in detail, those familiar with the art to which the invention relates will recognize various alternative designs and embodiments for practicing the invention as defined by the following claims.

What is claimed:

1. A lead-free, low-temperature electrical solder composition consisting essentially of:

43% Sn;

47% Bi;

5–15% Sb; and 0.1–3% of at least one metal selected from the group consisting of: Te, Se, Au, Ni, Ce, Cs, Co, Si, Mg, Ca, and a mixture of any of them, the solder having a melting temperature 133°–167° C.

* * * * *